United States Patent [19]

Freeland

[11] Patent Number: 4,555,135

[45] Date of Patent: Nov. 26, 1985

[54] BUILT-IN CHILD'S SAFETY SEAT FOR VEHICLES

[76] Inventor: Verne L. Freeland, Box 693652, Miami, Fla. 33169

[21] Appl. No.: 584,402

[22] Filed: Feb. 28, 1984

[51] Int. Cl.[4] .............................................. A47C 13/00
[52] U.S. Cl. .................................... 297/105; 297/238
[58] Field of Search ............... 297/105, 107, 108, 236, 297/237, 238, 233, 234

[56] References Cited

U.S. PATENT DOCUMENTS

| | | | |
|---|---|---|---|
| 1,063,809 | 6/1913 | Lawson | 297/236 |
| 1,965,048 | 7/1934 | Morris | 297/238 |
| 2,692,639 | 10/1954 | Genovese | 297/105 |
| 2,966,201 | 12/1960 | Strahler | 297/238 |
| 3,672,720 | 6/1972 | Wilson | 297/105 |

FOREIGN PATENT DOCUMENTS

| | | | |
|---|---|---|---|
| 2709005 | 10/1978 | Fed. Rep. of Germany | 297/233 |
| 2807064 | 8/1979 | Fed. Rep. of Germany | 297/237 |

Primary Examiner—Francis K. Zugel
Attorney, Agent, or Firm—Wigman & Cohen

[57] ABSTRACT

A built-in child's safety seat for vehicles is disclosed. The safety seat may be conveniently stored within the horizontal sitting surface of a passenger seat when not in use. By a simple pulling motion, a child's safety seat is formed which provides more protection to the child and which is less prone to be misused.

6 Claims, 4 Drawing Figures

BUILT-IN CHILD'S SAFETY SEAT FOR VEHICLES

BACKGROUND OF THE INVENTION

The present invention relates to safety seats for children and more particularly to a built-in child's safety seat for vehicles which may be conveniently stored within a passenger seat when not in use, and which may be easily pulled out when desired to accomodate and securely hold an infant or young child.

It has long been recognized that adult safety belts are inadequate to protect infants and small children in vehicles. Accordingly, many states have passed laws requiring the use of various types of child safety seats which, when properly used, provide adequate protection to infants. These devices have generally taken the form of a cradle-type housing which has straps securing it to the passenger seat. Often, they are used in conjunction with standard safety belts.

Although such child restraint devices provide adequate protection when properly used, they are often complicated and difficult to attach. Not surprisingly therefore there has been a great deal of misuse associated with them. This is especially a problem where there is a need to repeatedly attach and detach the device since parents often won't bother to take the time to do this properly.

Another problem associated with child restraint devices is that they are bulky and can get in the way when they are not being used. This makes them highly inconvenient, especially in smaller cars, and might also discourage their use.

Although other built-in child restraints have been developed, none are as effective, simple in design, and easy to use as that of the present invention.

In U.S. Pat. No. 4,230,366 issued to Ruda, an automotive seat with a built-in child restraint is disclosed. The child is protected by a U-shaped member which lifts from the seat on scissor linkages. The child sits on the remaining portion of the seat. As can be seen from FIG. 7 of Ruda, it is quite difficult to place the child in the safety seat since he or she would have to be lifted above the raised U-shaped member. This procedure could prove especially difficult where the car has a low roof. Additionally, on impact, the child could sustain serious injury since his or her rib cage would be forced against the U-shaped member.

U.S. Pat. No. 2,337,480 issued to Logan also discloses a built in structure for a child. Here, a seat section slides out horizontally from the back portion of the vehicle seat. A U-shaped restraining member is used to secure the child. Once again, the child's ribs will be forced against the U-shaped member during a collision.

SUMMARY AND OBJECTS OF THE INVENTION

In view of the foregoing limitations and shortcomings of the prior art devices, as well as other disadvantages not specifically mentioned above, it should be apparent that there still exists a need in the art for a child's vehicular safety seat which is easily stored and less prone to be misused.

It is, therefore, a primary objective of this invention to fulfill that need by providing a child's safety seat which is completely built into a vehicular passenger seat and which may be easily pulled out when needed.

It is another object of this invention to provide a child's vehicular safety seat into which a child may easily be placed after the seat is pulled out.

Yet another object of this invention is to provide a child's vehicular safety seat which affords greater protection to the child when a collision occurs.

Still another object of the invention is to provide a child's vehicular safety seat which does not utilize any open space in the passenger compartment when not in use.

Another object of this invention is to provide a child's vehicular safety seat which will accomodate children from infancy to an age well beyond 5 years old.

Briefly described, those and other objects of this invention are accomplished by providing a pivoting seat structure within the horizontal seat surface of a vehicular passenger seat. In its stored position, the seat structure is flush with the rest of the passenger seat and thus does not utilize any open space in the passenger compartment. By pivoting the seat structure outwardly, a child's safety seat is formed which is safer and easier to use than prior child restraining devices.

With the foregoing and other objects, advantages and features of the invention that will become hereinafter apparent, the nature of the invention may be more clearly understood by reference to the following detailed description of the invention, the appended claims and to the several views illustrated in the attached drawings.

DETAILED DESCRIPTION OF A PREFERRED EMBODIMENT

Figure 1:
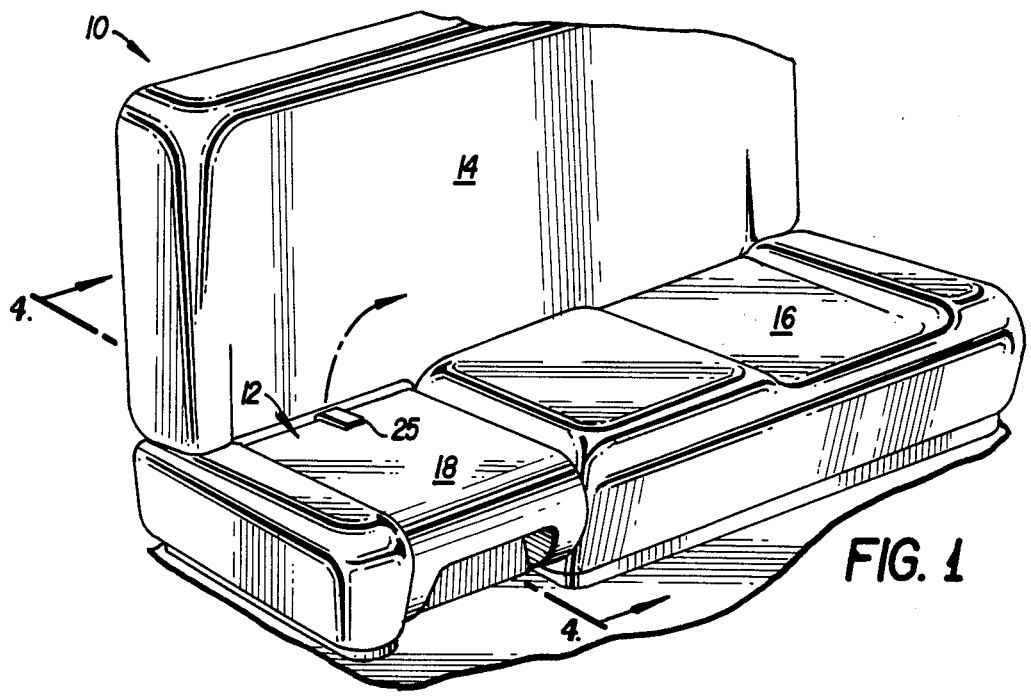
FIG. 1 is a perspective view of a vehicular passenger seat with the built-in child's safety seat in its stored position.

Referring now in detail to the drawings wherein like parts are designated by like reference numerals throughout, there is illustrated in FIG. 1 a perspective view of the vehicular passenger seat 10 with the child's safety seat 12 in its closed position.

Except for the child's safety seat 12, the passenger seat is of conventional design having a back support section 14 and a sitting surface 16. The child's safety seat may be built into the passenger side of the front seat and/or into either side of the back seat.

The child's safety seat itself comprises a movable seat structure 12 having a child's back support section 18 which is flush with the passenger seat 16 when the child's safety seat is being stored.

Figure 2:
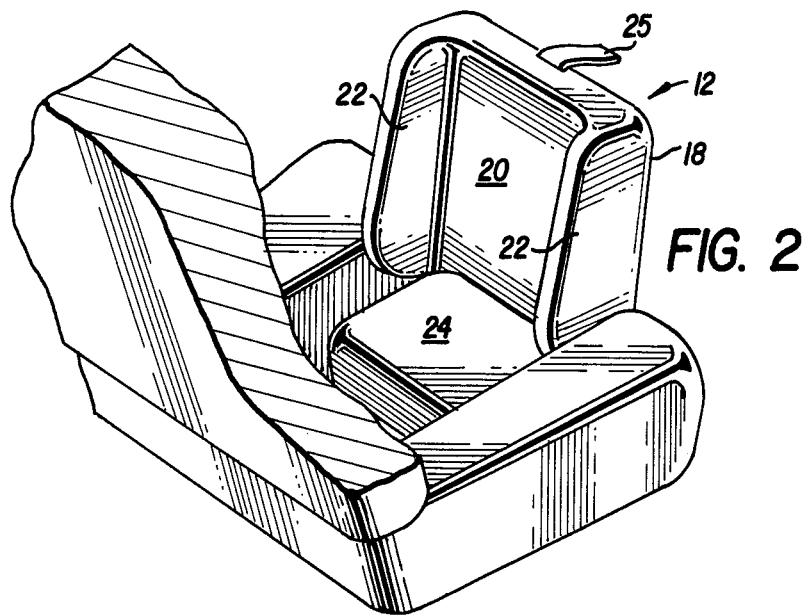
FIG. 2 is a perspective view in part taken through the back-rest portion of a passenger seat showing the built-in child's safety seat in its open position.
Figure 3:
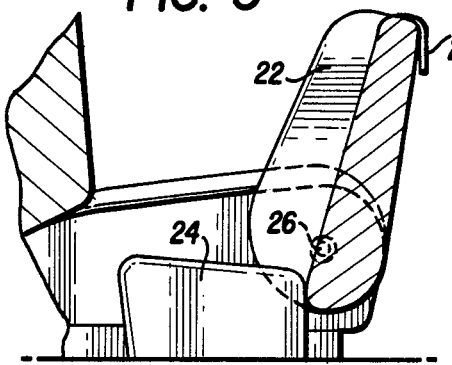
FIG. 3 is a cross-sectional view of the safety seat structure in its open position taken through the line A—A of FIG. 1.
Figure 4:
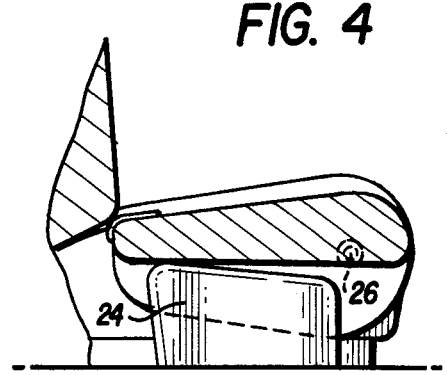
FIG. 4 is a cross-sectional view of the safety seat structure in its stored position taken through the line A—A of FIG. 1.

The child's safety seat 12 is shown in its open position in FIG. 2. It comprises a child's sitting surface 24 and a child's back support section 18. As shown in FIG. 4, the child's sitting surface 24 of the preferred embodiment is a separate structure which is stored beneath the movable back support section 18 when not in use. The back support section 18 may be provided with a pair of wings 22 on each side to give the child lateral support. The child thus rests his back on the surface 20 of the back support section 18.

To use the child's safety seat, the back support section 18, which is normally flush with the sitting surface 16, is raised upwardly. A tab 25 may be provided to facilitate gripping of this section. The back support section 18 is then pivoted from its stored horizontal position to its vertical position along the axis 26 thereby exposing the child's sitting surface 24. Although not shown in the Figures, a harnessing means is provided with the safety seat 12.

Unlike conventional child restraint devices, the device of the present invention can accomodate children well over 5 years old as well as infants. Additionally, during a collision the child will be urged towards the back support section of the seat rather than the safety belt thereby avoiding damage to the child's ribs. Also, since the device is so easy to pull out and does not require any complicated fastening procedures, there is little chance of improper use.

The present invention may be used in the front passenger seat and optionally, in one or more of the rear seats. Existing vehicles can be converted by replacement of existing seat bottoms with bottoms having a built-in safety seat. New vehicles of course could be equipped with such seats either as standard equipment or as an option.

Although only preferred embodiments are specifically illustrated and described herein, it will be appreciated that many modifications and variations of the present invention are possible in light of the above teachings and within the purview of the appended claims without departing from the spirit and intended scope of the invention.

I claim:

1. A vehicle seat combined with a child's safety seat, comprising:
   a first vehicle seat;
   a first back rest mounted to the rear end of the first seat;
   a child's seat mounted within an opening in the first vehicle seat and having a sitting surface recessed from the sitting surface of the first vehicle seat; and
   a second back rest mounted at its lower end for pivotal movement only with respect to the forward end of the child's seat;
   the second back rest being pivotable from a storable position overlaying said child's seat wherein a top surface thereof is substantially coplanar with the first seat thereby forming a continuation of the first seat to a usable position wherein the second back rest is substantially upright;
   wherein said seat structure rotates in a direction away from the back-rest surface of said vehicle seat such that the child's seat user would face the rear of the vehicle.

2. The vehicle seat according to claim 1, further comprising:
   wing means for providing lateral support mounted on each lateral edge of the second back rest.

3. The vehicle seat according to claim 2, whereby when the second back rest is in the storable position, the wing means extend along opposite edges of the child's seat.

4. The vehicle seat according to claim 1, further comprising means between the child's seat and the rear end of the first vehicle seat for recciving the legs of a user of the child's seat.

5. A vehicle seat combined with a child's safety seat, comprising:
   a first vehicle seat;
   a first back rest mounted to the rear end of the first seat;
   a child's seat mounted within an opening in the first vehicle seat and having a sitting surface recessed from the sitting surface of the first vehicle seat;
   a second back rest pivotally mounted at its lower end with respect to the forward end of the first vehicle seat; and
   wing means for providing lateral support mounted on each lateral edge of the second back rest;
   the second back rest being pivotable from a storable position overlaying said child's seat wherein a top surface thereof is substantially coplanar with the first seat thereby forming a continuation of the first vehicle seat to a usable position wherein the second back rest is substantially upright;
   whereby when the second back rest is in the storable position, the wing means extend along opposite sides of the child's seat.

6. A vehicle seat combined with a child's safety seat, comprising:
   a first vehicle seat;
   a first back rest mounted to the rear end of the first seat;
   a child's seat mounted within an opening in the first vehicle seat and having a sitting surface recessed from the sitting surface of the first vehicle seat;
   a second back rest pivotally mounted at its lower end with respect to the forward end of the first vehicle seat;
   the second back rest being pivotable from a storable position overlaying said child's seat wherein a top surface thereof is substantially coplanar with the first seat thereby forming a continuation of the first seat to a usable position wherein the second back rest is substantially upright;
   further comprising means between the child's seat and the rear end of the first vehicle seat for receiving the legs of a user of the child's seat.

* * * * *